United States Patent [19]

Gold

[11] Patent Number: 4,778,064

[45] Date of Patent: Oct. 18, 1988

[54] GLASS PANEL CARRIER

[76] Inventor: Peter Gold, 465 N. Wood Rd., Rockville Centre, N.Y. 11570

[21] Appl. No.: 26,832

[22] Filed: Mar. 17, 1987

[51] Int. Cl.⁴ .............................................. A47G 19/08
[52] U.S. Cl. ...................................... 211/41; 211/182; 206/456
[58] Field of Search ...................... 211/41, 182; 280/46, 280/79.1; 206/448, 453, 454, 455, 456

[56] References Cited

U.S. PATENT DOCUMENTS

| | | | |
|---|---|---|---|
| 1,853,888 | 4/1932 | Williams | 211/41 |
| 2,946,453 | 7/1960 | Pityo | 211/41 |
| 4,033,597 | 7/1977 | Boyer | 211/41 X |
| 4,093,251 | 6/1978 | Boyer | 211/41 X |
| 4,368,822 | 1/1983 | Kramer et al. | 211/41 |

Primary Examiner—Reinaldo P. Machado
Assistant Examiner—Sarah A. Lechok Eley
Attorney, Agent, or Firm—Collard, Roe & Galgano

[57] ABSTRACT

A glass panel carrier, especially intended for automobile windshields includes a pair of generally parallel, laterally spaced-apart support rails, and at least one transverse support member disposed in between and attached to the rails. A multiplicity of fittings each having at least one branch leg, are slidably supported in fixed positions on the rails and are mounted with the branch legs positioned generally perpendicular to the rails, the fittings being configured to prevent any axial rotation thereof. A multiplicity of posts are provided, each of which is associated with one of the T-shaped fittings, with the post releasably engaging the branch leg of the associated fitting. The posts in adjacent fittings on each rail and opposing fittings on the opposite rail cooperate in holding glass panels therebetween during transport and/or storage thereof.

12 Claims, 5 Drawing Sheets

GLASS PANEL CARRIER

BACKGROUND OF THE INVENTION

The invention relates to a carrier for glass panels or sections. More particularly, it relates to a carrier or rack assembly for carrying and storing auto glass, such as windshields.

In the manufacture of new automobiles, it is necessary that auto glass, such as windshields, be readily transported to the location where they are installed into the auto body. It may also sometimes be necessary or convenient for windshields to be stored at a particular point at the manufacturing location. Similarly, in auto body repair and auto glass repair shops, it is frequently necessary that windshields be moved from one point to another, or stored within the shop. Furthermore, in connection with the operation of an auto body repair or auto glass repair shop, windshields must often be transported in a van or truck from a windshield source, such as a glass manufacturer, or an auto wrecking yard, to the repair shop. Most often, many windshields need to be transported or stored at once, again necessitating the use of a storage or rack apparatus.

Due to the brittle and somewhat fragile nature of the windshields, a windshield rack or carrier must be designed with certain specialized glass carrying features. As the glass of a windshield is prone to chipping or cracking from impact or excessive force at the edges of the glass, the surfaces of a windshield carrier contacting these edges must, of course, be of a soft or resilient material, so as to avoid damaging the glass. In addition, the windshields must be supported in the carrier in a manner that does not result in excessive tensile stress at any point on the windshield, in order to avoid exceeding the relatively low tensile strength of the glass and cracking it. As modern automotive windshields weigh about 35 lbs. each, a rack or carrier for holding or storing such windshields must also have sufficient strength and rigidity, especially in view of the fact that as many as thirty or even more windshield units may require transport or storage at any single time.

Windshields are most often loaded and unloaded by hand, so it is important that the carrier should be able to easily accept a windshield, so that it may be gently placed onto the carrier with a minimum of lifting or maneuvering by the windshield handlers. Furthermore, the carrier must be able to accept and securely hold windshields or glass panels having a variety of shapes, ranging from almost flat planes to windshields having extreme curvature, such as those now more frequently found in certain modern automobiles.

Various containers, racks, or carriers have been known in the past for storing or transporting glass panels, such as windshields. For example, U.S. Pat. No. 4,033,597 to Boyer discloses an apparatus for carrying glass panels having two elongated sides of a body frame covered with a hard rubber base with a plurality of upright dowels extending vertically from each side. The dowels are covered with a sponge rubber sleeve. However, many of these previous carriers such as the apparatus of U.S. Pat. No. 4,033,597 are mechanically complicated and difficult to readily fabricate, as a large amount of assembly, e.g., welding, is required, resulting in an expensive and unduly overweight apparatus. Furthermore, the loading and unloading of windshields from known windshield carriers or racks often create substantial difficulty in that excessive lifting and maneuvering of windshields is required, due to the way the windshields are held in place in the rack. Moreover, with some previously known windshield racks, certain modern highly curved windshields cannot be accommodated, due to interference between adjacent windshields and rack holding elements.

Accordingly, it is an object of the invention to provide a windshield carrier which is exceptionally easy and inexpensive to manufacture, yet which readily and securely accepts and holds a wide range of windshields, including highly curved windshields.

It is also an object of the invention to provide such a windshield carrier which can be manufactured with a minimum amount of substantially standard widely available components, which may be assembled with a minimum amount of machining, assembly skills, and fasteners.

It is yet another object of the invention to provide such a windshield carrier which is unusually lightweight in design, in comparison to existing carriers, yet which is exceptionally strong, durable, and rigid, thereby allowing for the secure and reliable storage and/or transportation of glass windshields.

It is a further object of the invention to provide such a carrier which may be used in an upright or vertical position generally for transportation of windshields on a cart, or in a vehicle, and which may also be used in a substantially horizontal or lateral position on a floor stand or attached to a wall surface, primarily for storage of windshields.

It is a more particular object of the invention to provide such a windshield carrier having the foregoing attributes and characteristics which gently yet securely holds and supports windshields, with no substantial risk of chipping or cracking.

SUMMARY OF THE INVENTION

Certain of the foregoing and related objects are readily attained in an auto glass panel carrier comprising a pair of parallel laterally spaced-apart support rails joined to each other by at least one cross member disposed between the rails. A multiplicity of fittings having a branch leg are slidably disposed over each of the rails, with the branch legs positioned in a generally perpendicular manner to the rails. The fittings are configured so as to prevent any relative axial rotation thereof. A post is releasably engaged to the branch leg of each fitting. The posts are therefore uniformly spaced apart and are also oriented in an upright position for holding auto glass panels during transport and/or storage. The fittings on the rails are preferably held in position and prevented from axially rotating on the rail by the provision of means for lockingly engaging adjacent fittings. Advantageously the fittings are T or X-shaped.

Preferably, each post includes a bushing made of a resilient material adjacent to each of its ends to provide a soft surface for supporting a windshield. The end of each post may include a groove for accepting the resilient bushing. Most desirably, the posts are made of wood to avoid chipping, scratching, or cracking of windshields. The posts may be threadably engaged into the branch legs of the T-shaped fittings or, alternatively, they may be installed with a simple friction fit. A resilient covering, such as a split hose of soft material, is advantageously provided as a cover over the rails.

Most desirably, the means for releasably lockingly engaging the T-shaped fittings includes a tab and notch arrangement whereby a tab on the coaxial leg of one T-shaped fitting protrudes into and engages a notch in a coaxial leg of the adjacent and adjoining T-shaped fitting. The tab and complimentary notch may have a variety of shapes, including triangular, square, etc. Within the scope of the invention, the means for releasably lockingly engaging the T-shaped fittings is required only if the support rails, and the T-shaped fittings which fit thereover, are round in cross section, which is the preferred configuration for manufacturing and cost reasons. If the support rails have a non-round cross section, such as e.g., square, hexagonal, etc., then the T-shaped fittings, although slidably engaged thereon, would not be able to axially rotate on the supports, thereby obviating the need for any means for lockingly engaging the T-shaped fittings together. However, it is anticipated that, even for cost reasons alone, only support rails having a round cross section will be commonly used.

BRIEF DESCRIPTION OF THE DRAWINGS

Other objects and features of the present invention will become apparent from the following detailed description considered in connection with the accompanying drawings, which disclose several embodiments of the invention. It is to be understood that the drawings are to be used for the purpose of illustration only, and not as a definition of the limits of the invention.

In the drawings, wherein similar reference characters denote similar elements throughout the several views.

DESCRIPTION OF THE PREFERRED AND ILLUSTRATED EMBODIMENTS OF THE INVENTION

Figure 1:
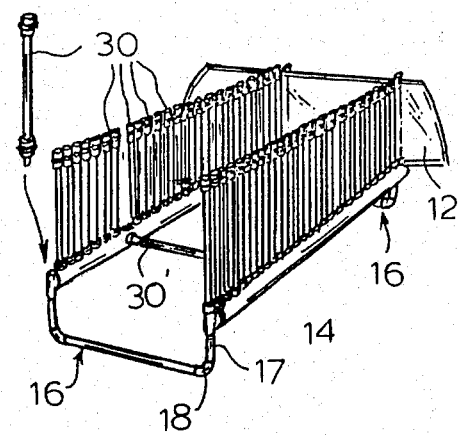
FIG. 1 is a perspective view of a glass panel carrier embodying the present invention.

Turning now in detail to the appended drawings and, in particular, FIG. 1 thereof, therein illustrated is a novel auto windshield carrier embodying the present invention generally designated by reference numeral 10.

Carrier 10 serves to support a plurality of glass panels or windshields 12 for storage and/or transport from one place to another. Carrier 10 includes a pair of parallel, laterally spaced apart support rails 14 which are, in turn, supported by a pair of U-shaped cross members or rail assemblies 16. Each of the support rails 14 has releasably but securely mounted to the top surface thereof a row of spaced-apart, substantially upright dowels or cylindrical support members 30 between which the glass panels 12 are inserted and separately supported.

Figure 2:
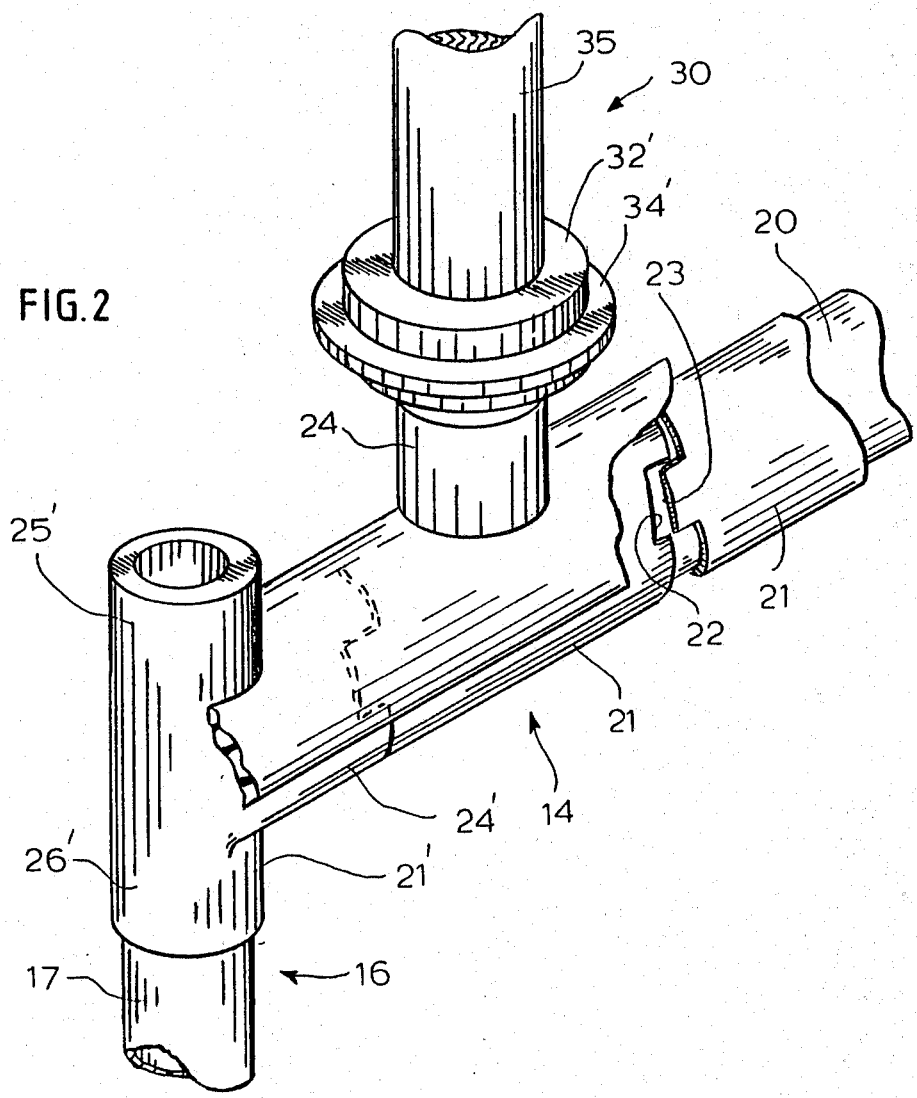
FIG. 2 is an enlarged, fragmentarily-illustrated elevational view of a portion of the carrier shown in FIG. 1.

As can be seen more clearly in FIG. 2, each of the side rails 14 is composed of an elongated inner tubular rail 20 made of standard conventional pipe of cylindrical cross-section cut approximately to the desired length of the carrier 10. Slidably mounted on the inner pipe 20 are a multiplicity of conventional or standard tubular T-shaped pipe fittings 21, the ends of which have been notched to provide interlocking tongue 22 and groove 23 connections between adjacent T-shaped fittings 21. Except for the end T-shaped fittings 21' which may be rigidly fastened to the inner rail 22 by means of a pin (not shown), the remaining T-shaped fittings are simply held in place by means of their mechanically interlocking tongue-and-groove connections, i.e., no welding together of the various parts is necessary. Of course, the configuration of the tongue-and-groove connections can be modified as desired as long as the mechanical interlocking is effected, as this is necessary to maintain the vertical alignment of the upper middle leg 24 of the T-shaped members 21.

The end T-shaped fittings 21' are oriented at a 90° angle with respect to the inner T-shaped fittings 21 so that the middle leg 24' thereof is slid on the end of the inner rail 22, thereby providing both upper and lower extending legs 25' and 26', respectively. The lower legs 26' of the end T-shaped fittings 21' serves as a support for the rail 14 while the upper leg 25' serves the same purpose as upper legs 24 of the inner fittings 21-namely, as a support for the dowels as described in greater detail hereinafter. Alternatively, a one-piece or multi-piece U-shaped transverse support 16 may be inserted in a friction fit manner into the lower legs 26' of the T-shaped end pieces 21' to provide transverse support for the rails 24 and the carrier 10. In the case of the one-piece support, this can be easily fabricated by simply bending a single length of pipe in a U-shape. On the other hand, the multi-piece embodiment can be fabricated by alternating standard straight pipe segments 17 and elbow joints or connectors 18, as shown in FIG. 1, which are joined together also in a friction fit manner. Similarly, where it is desired to provide additional transverse support between the rails 14, opposing T-shaped members 21 on rails 22 may be pivoted 90° inwardly so that the middle legs 24 thereof face and oppose one another and a straight dowel 30' may be inserted between the two legs to thereby maintain proper spacing of the rails and provide proper transverse support for the carrier (see FIGS. 1, 4 and 6).

Figure 3:
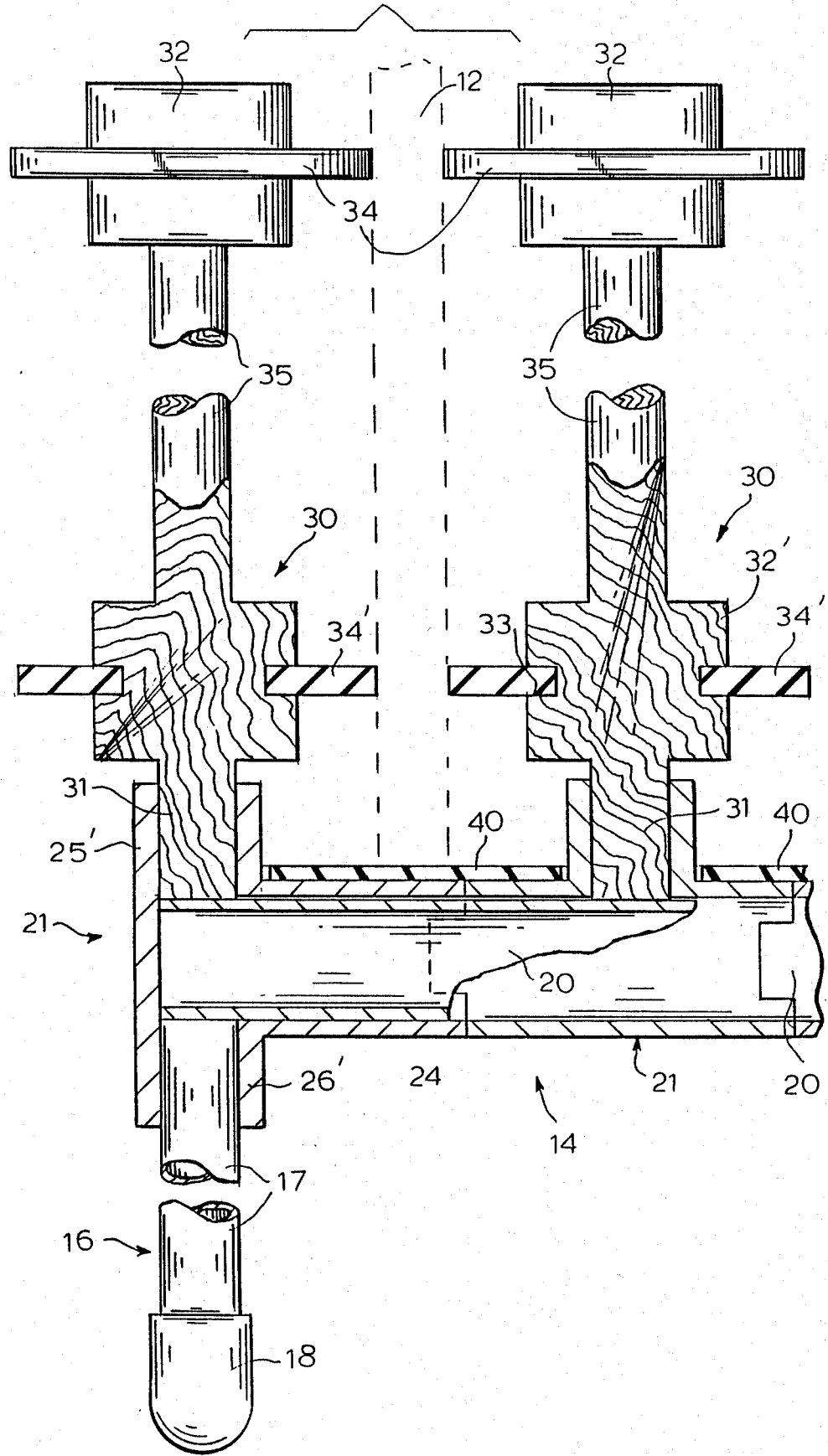
FIG. 3 is an enlarged, fragmentarily-illustrated side elevational view, in part section, of a portion of the apparatus of FIG. 1.

As seen best in FIG. 3, each of the upstanding middle legs 24 of the T-shaped fittings 21 support an upright generally cylindrical dowel 30 preferably made of wood due to its resiliency. Dowel 30 has a lower cylindrical end 31 which is dimensioned such that it is frictionally engaged within the upper leg 24 of the T-shaped fitting 21. Both the top end of the dowel and the portion adjacent to the lower end 31 thereof disposed immediately above the upstanding leg 24 of the T-shaped fitting 21 is provided with an enlarged cylindrical head 32, 32', respectively, provided with an annular groove 33 in which is frictionally fitted a rubber gripping ring 34, 34', respectively. The upper and lower rubber gripping rings 34, 34' serve to cooperate with the rings 34, 34' of the adjacent dowels to grasp the glass windshield 12 interposed therebetween (shown in phantom), thereby providing a resilient support and avoiding any scratching thereof from the wooden part of the dowel-i.e., the shank 35 or the heads 32, 32'. The rubber gripping rings, if desired, can be oval or irregular in shape and be rotatable under sufficient manual force in the support grooves 33 so as to permit one to adjust the position of the rings' leading gripping edges relative to the windshield held therebetween. This facilitates the accommodation of different windshield widths or configurations (such as when dealing with curved windshields) and allows adjustment of the tension or gripping force applied to the windshields so as to allow for easy and facile insertion and removal while affording a relatively firm and stable support during storage and/or transport. It should also be noted that the dowels can also be easily removed to allow for the lateral insertion (e.g., from the side) and removal of curved glass.

Rails 14 are provided on their upper surface with a rubber pad or layer 40 on which the lower edge of the glass windshield may rest, thereby prevent cracking, chipping or breakage thereof. This rubber pad is essentially composed of a rubber or elastomeric rectangular sheet which is provided with circular cutouts so that the same may be placed on the rails 14 while allowing the upstanding legs 24 of the T-shaped members 21 to project outwardly and upwardly therefrom. The wooden dowels 30 can easily be made by machining or milling at a relatively inexpensive cost. However, other materials could, of course, be used, such as plastic or metal tubular rods which would also be frictionally inserted into the upstanding legs of the T-shaped connectors 21. It should also be realized that if straight pieces are used for the dowels, i.e., without the enlarged heads, then it would be necessary to cover the opposing surfaces of the dowels which might contact the glass inserted therebetween (see, e.g., the sponge rubber sleeves, caps, etc., used in U.S. Pat. No. 4,033,597).

Figure 4:
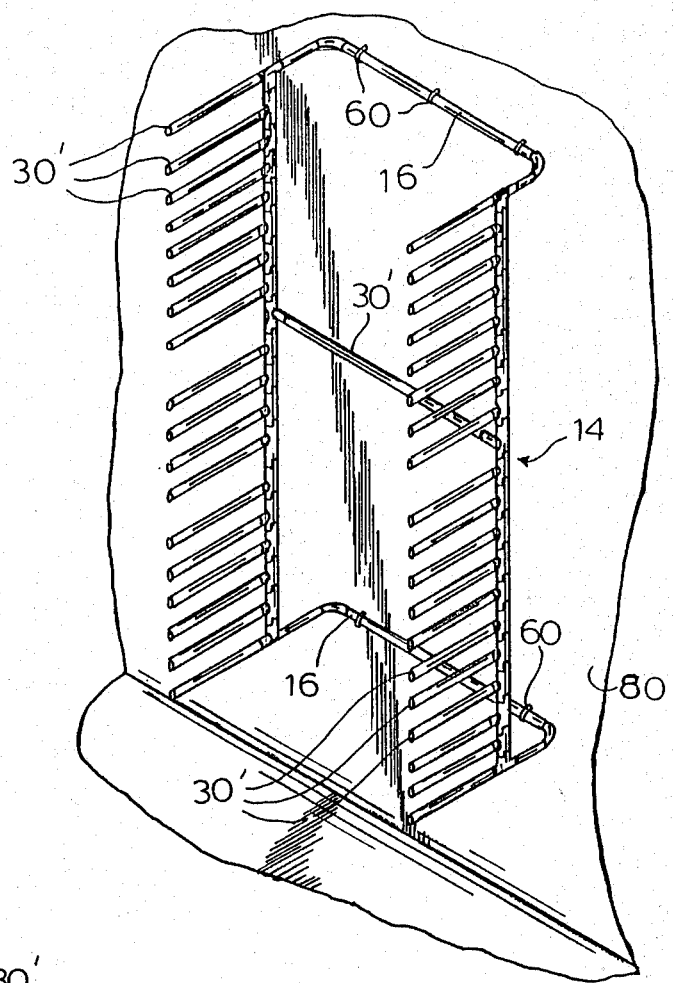
FIG. 4 is a perspective view of an upright glass stationary panel carrier embodying the present invention.

FIG. 4 shows an alternate embodiment of the vertically arranged auto glass carrier which is identical to that shown in FIG. 1 except for its vertical arrangement and the use of straight dowels 30'. In this embodiment, the U-shaped transverse support rails 16 can be fixed to the wall 80 by conventional means, such as brackets or clamps 60 etc., to provide a rigid mounting.

Figure 5:
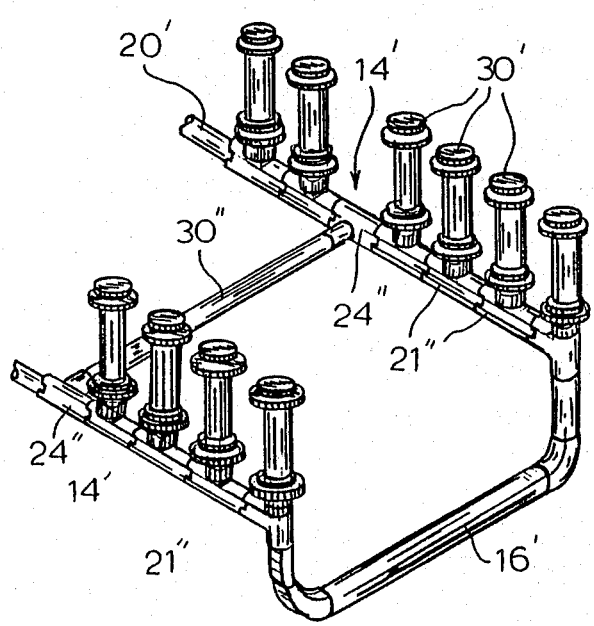
FIG. 5 is an enlarged, fragmentarily-illustrated alternate embodiment of a glass panel carrier embodying the present invention.

FIG. 5 shows an alternate embodiment of the invention wherein the rails 14' comprise tubular inner rails 20' and tubular T-shaped fittings 21" which have a polygonal profile, in this case, a square-shaped cross section rather than a cylindrical one; this also applies to the transverse support rail assemblies 16'. Due to this arrangement, it may be possible to eliminate the need for a mechanical interlocking inasmuch as the square profile prevents the rotation of the individual members. In this embodiment, the dowels 30" would, of course, have to be modified with a square-shaped cross-section to fit into the correspondingly square-shaped upper leg of the T-shaped fitting 21".

Figure 6:
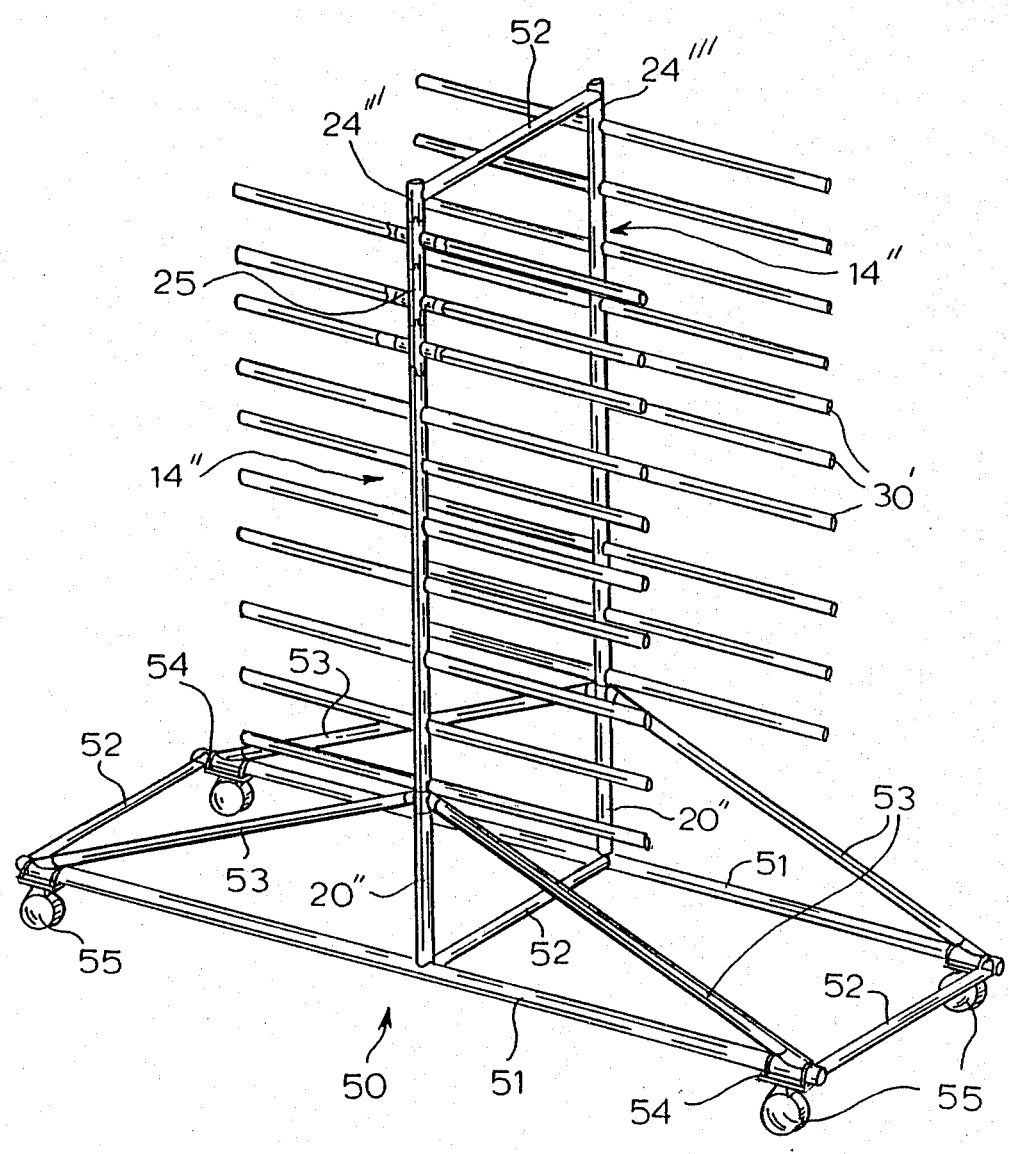
FIG. 6 is a perspective view of a movable floor stand embodying the present invention.

FIG. 6 discloses an alternate embodiment of the invention wherein the windshield carrier is in the form of a movable floor stand. In this embodiment, rails 14" are arranged in a vertically spaced-apart parallel manner and are held in this position at their upper end by a transverse pipe section 52 inserted into the middle leg of the end T-shaped members 24''' facing one another. The lower end of the rails 14" are, in turn, supported by a generally rectangular support base frame 50 composed of spaced-apart interconnected longitudinal and transverse pipe sections 51 and 52, respectively, which can be welded together or fastened in a mechanical interlocking manner similar to the rails 14". The base frame 50 also has two pairs of angled support rails 53 joined to the corners of the base frame at their lower ends and to the rails 14" at their upper end to provide additional support. Conventional support rollers 55 are secured to the ends of the longitudinal pipe sections 51 by U-shaped clamps 54, thereby allowing the stand to be rolled from one place to another. In this embodiment, except for the upper end pieces, the T-shaped fittings 24 are replaced by four-way or X-shaped fittings 25 so that dowels 30' may be inserted and extend outwardly laterally from opposite sides of each of the rails 14". In this way, the carrier capacity is doubled. Also, in this embodiment straight dowel segments are shown. Consequently, the dowels are covered with a rubber coating or sheath to protect the glass windshields from scratching.

Figure 7:
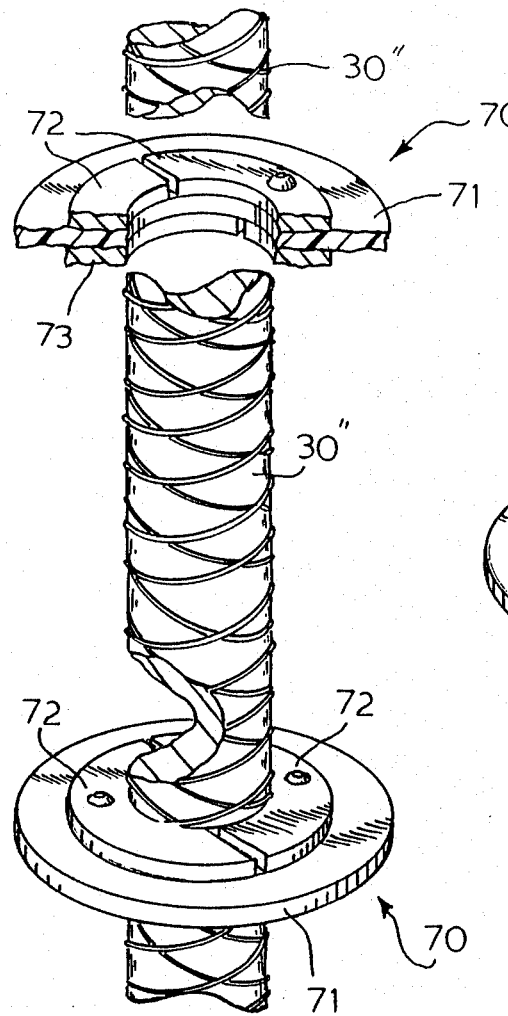
FIG. 7 is an enlarged, fragmentarily-illustrated perspective view, in part section and with portions cut away, of an alternate embodiment of the dowel assembly employing an expandable retaining ring for supporting a glass panel.
Figure 8:
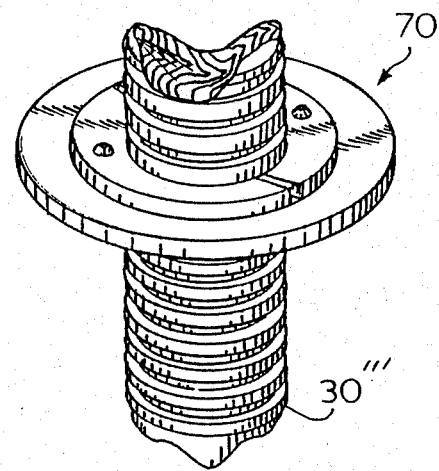
FIG. 8 is an enlarged, fragmentarily-illustrated perspective view of a further embodiment of the dowel assembly which also employs the expandable retaining ring.

FIGS. 7 and 8 illustrate alternate embodiments for the dowel assembly. In FIG. 7, the dowel 30" comprises a striated steel rod of the type used as concrete reinforcements. Instead of the fixed cylindrical heads 30 and 32' used in conjunction with the wooden dowels of FIG. 3, a pair of expandable retaining rings 70 are employed which are movable along the length of dowel 30" so as to accommodate different sized glass (i.e., glass of different heights or curvature, etc.). The expandable retaining ring is disclosed in detail in my co-pending application, Ser. No. 940,335 filed Dec. 11, 1986, the subject matter of which is incorporated herein by reference thereto.

Each of the retaining rings 70 include a resilient central layer 71 surrounded by or sandwiched between a first or upper rigid outer layer 72 and a second or lower rigid outer layer 73, to form a three-layered sandwich-like construction. The upper and lower layers 72 and 73, respectively, preferably consist of a split annular metal ring and the resilient layer is preferably made of a resilient or plastic material having a larger outside diameter than the metal rings. The three layers are preferably held together via rivets or ferrules 74. The splits in the upper and lower rings are preferably offset axially with respect to one another so that the ring cannot bend about a common axis. Due to the resilient construction of the inner layer and the split construction of the outer metal rings, it is possible to expand the rings (preferably by means of a forceps-like tool which is inserted into the rivet holes) so as to allow the same to be slid over the striated steel rod and once positioned thereon at the desired point, it is released such that in its relaxed state it will frictionally engage the dowel. Due to the fact that the inner rubber layer has a larger diameter than the metal layers, only the outer edges thereof will contact the glass panel 12. By the use of this construction, relatively inexpensive steel rods which are readily available can be used as the dowels.

FIG. 8 shows an alternate embodiment of the dowel which, in this case, consists of a wooden dowel 30''' having a series of annular grooves formed therein along the length thereof. The retaining ring 70 is of the same construction as that shown in FIG. 7 and is dimensioned such that it may be expandable to fit over and onto the dowel and then released so that the same engages within one of the grooves of dowel 30'''. Here, too, the retaining rings may be shifted along the length of the dowel 30''' to the desired height whereupon it can then releasably engage one of the grooves of dowel 30'''.

Figure 9:
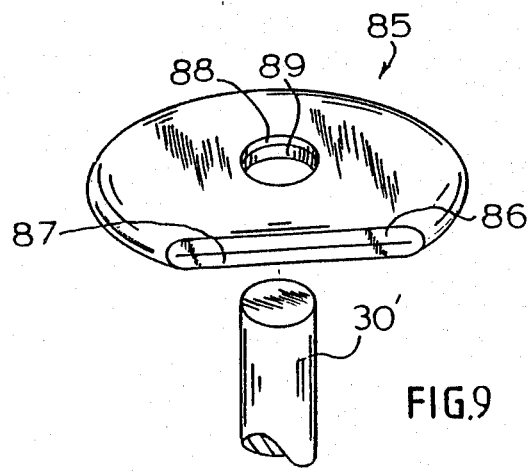
FIGS. 9 and 10 are enlarged, fragmentarily-illustrated perspective views of yet another embodiment of the dowel assembly, showing an expandable retaining disc prior to, and after mounting on a dowel, respectively.
Figure 10:
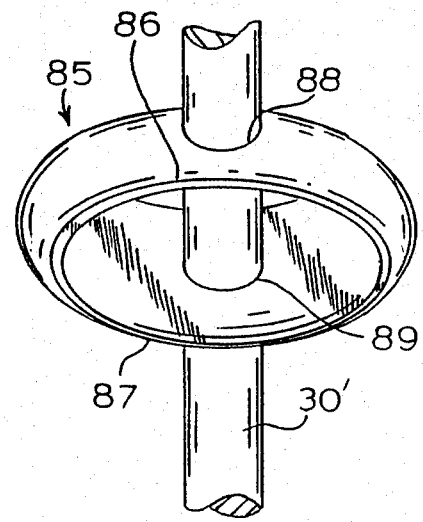

FIGS. 9 and 10 illustrate a further alternate embodiment of the dowel assembly and, in particular, the expandable retaining disc. In this embodiment, a straight wooden dowel 30' is advantageously employed in combination with an expandable, resilient retaining ring 85 preferably made of an elastomeric material. Ring 85 in its relaxed, unstressed normal state assumes an annular, oval or otherwise elliptical cross-sectional profile (FIG. 10) but it may be flattened under stress (FIG. 9) to allow for initial insertion on the dowel 30'.

More particularly, ring 85 has an upper half segment 86 and a lower half segment 87, in each of which an aligned hole 88 and 89, respectively, is formed. Holes 88, 89 have a diameter which is equal to or slightly larger than the diameter of dowel 30' so as to allow for relatively easy insertion and mounting on dowel 30' when in the stressed, flattened condition shown in FIG. 9 and so as to provide for a releasable frictional engagement when released to assume its normal expanded condition as shown in FIG. 10. The ring 85 can be easily adjusted to a different position on the dowel 30 by simply squeezing it so that it assumes the disclike, flattened condition of FIG. 9, then sliding it along and on the dowel 30' to the desired new position and then releasing it so as to allow it to expand and frictionally engage dowel 30'. As can be appreciated, the angular orientation of the ring (relative to the dowel vertical axis) can be adjusted to accomodate curved glass panels. Similarly, instead of a ring-like profile, other expandable tubular or hose-like retaining elements may be used, thereby allowing for greater spacing of the dowels.

Various modifications may, of course, be made as will be apparent to those skilled in the art. For example, although the dowels are preferably supported in the legs of the T-shaped supports by a friction fit, both the legs and the dowels could be threaded to provide a screw fit; other mechanical interlocking connections could also be used. Moreover, while it is anticipated that two retaining rings or elements would be used per dowel, the number may, of course, be varied to suit the particular application and glass configuration. In addition, although several preferred mounting methods have been shown, many other arrangements are possible.

Thus, while only several embodiments and examples of the present invention have been described, it is obvious that many changes and modifications may be made thereunto, without departing from the spirit and scope of the invention.

What is claimed is:

1. A glass panel carrier comprising:
a pair of generally parallel, laterally spaced-apart support rails;
at least one transverse support member disposed in between and attached to said rails;
a predetermined number of T-shaped fittings, each having at least one branch leg, which fittings are slidably mounted on each of said rails with said branch legs positioned generally perpendicular to said rails, said T-shaped fittings being mechanically interlocked with adjacent T-shaped fittings to prevent any axial rotation therebetween, said predetermined number of T-shaped fittings being a function of the desired length of said glass panel carrier; and
a multiplicity of posts, each of which is associated with one of said T-shaped fittings, with said post releasably engaging said branch leg of the associated fitting for easy removal therefrom, said posts in adjacent fittings on each rail and opposing fittings on the opposite rail cooperating to hold the glass panels therebetween during transport and/or storage thereof.

2. The carrier of claim 1, wherein said posts are made of wood.

3. The carrier of claim 1, wherein said posts are frictionally engaged into said branch legs.

4. The carrier of claim 1, further comprising a resilient covering on said rails.

5. The carrier of claim 1, additionally including means for releasably lockingly engaging adjacent fittings.

6. The carrier of claim 5, wherein said fittings each have two coaxial legs, and wherein said means for releasably lockingly engaging adjacent fittings comprises a tongue and groove arrangement wherein a tongue on a coaxial leg of one fitting protrudes into and engages a groove in a coaxial leg of an adjacent and adjoining fitting.

7. The carrier of claim 1, wherein said carrier has a pair of said transverse supports which are U-shaped and disposed at the ends of said rails.

8. The carrier of claim 7, wherein said carrier and said rails are horizontally disposed.

9. The carrier of claim 7, wherein said carrier and said rails are vertically disposed.

10. The carrier of claim 1, further comprising at least one expandable retaining element releasably and frictionally mounted on each of said posts.

11. The carrier of claim 10, wherein said retaining element comprises an annular resilient ring having a tubular-like cross-section which has a hole formed therethrough, which ring may be manually flattened so as to allow for insertion on said post via said hole thereof and then released so that it may assume its normal unstressed expanded condition so as to frictionally engage and be supported by said post.

12. A glass panel carrier comprising:
a pair of generally parallel, laterally spaced-apart support rails;
at least one transverse support member disposed in between and attached to said rails;
a predetermined number of T-shaped fittings, each having at least one branch leg, which fittings are slidably mounted on each of said rails with said branch legs positioned generally perpendicular to said rails, said T-shaped fittings being mechanically interlocked with adjacent T-shaped fittings to prevent any axial rotation therebetween, said predetermined number of T-shaped fittings being a function of the desired length of said glass panel carrier;
a multiplicity of posts, each of which is associated with one of said T-shaped fittings, with said post releasably engaging said branch leg of the associated fitting for easy removal therefrom, said posts in adjacent fittings on each rail and opposing fittings on the opposite rail cooperating to hold the glass panels therebetween during transport and/or storage thereof; and
at least one expandable glass panel retaining element releasably and frictionally mounted on each of said posts.

* * * * *